(12) United States Patent
Nishida et al.

(10) Patent No.: US 6,680,040 B1
(45) Date of Patent: Jan. 20, 2004

(54) SOL HAVING FINE PARTICLES DISPERSED AND METHOD FOR PREPARING

(75) Inventors: Hiroyasu Nishida, Kitakyushu (JP); Mitsuru Nakai, Kitakyushu (JP); Michio Komatsu, Kitakyushu (JP); Hiroo Yoshitome, Kitakuyshu (JP)

(73) Assignee: Catalysts & Chemicals Industries Co., Ltd., Kawasaki (JP)

( * ) Notice: Subject to any disclaimer, the term of this patent is extended or adjusted under 35 U.S.C. 154(b) by 0 days.

(21) Appl. No.: 09/868,860

(22) PCT Filed: Dec. 16, 1999

(86) PCT No.: PCT/JP99/07069
§ 371 (c)(1),
(2), (4) Date: Jun. 21, 2001

(87) PCT Pub. No.: WO00/37359
PCT Pub. Date: Jun. 29, 2000

(30) Foreign Application Priority Data

Dec. 21, 1998 (JP) .......................................... 10-362137
Jul. 19, 1999 (JP) .......................................... 11-205390

(51) Int. Cl.$^7$ ................................................ C01B 33/12
(52) U.S. Cl. ..................................... 423/335; 423/339
(58) Field of Search ................................ 423/335, 334; 502/232, 240

(56) References Cited

U.S. PATENT DOCUMENTS

| 4,070,286 A | * | 1/1978 | Iler et al. | .................... 210/656 |
| 5,024,826 A | * | 6/1991 | Linton | ......................... 423/335 |
| 6,013,372 A | * | 1/2000 | Hayakawa et al. | ....... 428/411.1 |

FOREIGN PATENT DOCUMENTS

| JP | 3-139537 | 6/1991 |
| JP | 7-133105 | 5/1995 |
| JP | 9-278414 | 10/1997 |

\* cited by examiner

*Primary Examiner*—Stanley S. Silverman
*Assistant Examiner*—Edward M. Johnson
(74) *Attorney, Agent, or Firm*—Kanesaka & Takeuchi

(57) ABSTRACT

The porous composite oxide particle is coated with a porous silica-based inorganic oxide layer, and also a substrate has a coating film with the fine particles thereon, which has a low refractive index and excellent in adhesion with a resin or the like, strength, the ability to reduce reflection and the like. The fine particles include porous composite oxide with silica and an inorganic oxide other than silica, wherein the fine particles are coated with a porous silica-based inorganic oxide layer having a thickness from 0.5 to 20 nm. The fine particles include preferably an organic group directly bonded to silicon, and $S_R/S_T$, the ratio of the molar amount of silicon having the organic group directly bonded thereto ($S_R$) vs the molar amount of the total silicon ($S_T$), is preferably in the range from 0.001 to 0.9.

19 Claims, No Drawings

SOL HAVING FINE PARTICLES DISPERSED AND METHOD FOR PREPARING

FIELD OF THE INVENTION

The present invention relates to a fine particle prepared by coating a surface of a porous composite oxide particle with a silica-based inorganic oxide layer. Also the present invention relates to a sol prepared by dispersing said fine particles in a dispersion medium and a production method for the same as well as to a substrate with an anti-reflection coating film containing said fine particles formed on the surface thereof.

BACKGROUND TECHNOLOGY

The present inventors previously made an invention of silica sol as well as of composite oxide sol such as silica-alumina sol and silica-zirconia sol in which fine and porous particles each having a large specific surface area are dispersed (Japanese Patent Laid-Open Publication No. HEI 5-132309). The composite oxide sol is used by making use of its porosity for various applications such as a binder, an absorbent, a filler having low refractive index and others, in addition to its use as a catalyst.

Further to prevent reflection on a surface of a substrate such as glass or plastic sheet, there has been known the technology for forming an anti-reflection coating film on the surface, and for instance, a coating film made from a low refractive index substance such as a fluorine resin or fluoride magnesium is formed on a surface of a glass or plastic sheet by means of the coating method, the evaporation method, or the CVD method. These methods are, however, expensive in the cost, and the durability is not so high.

There has been known also the method in which an anti-reflection coating film having fine and uniform convex and concave sections is made from fine particles of silica by applying a coating liquid containing fine particles of silica on a surface of a glass sheet. In this method, the reflection is prevented by making use of the effect that normal reflection is reduced by random reflection of light on an irregular surface made from fine particles of silica, or by making use of an air layer in clearance between the fine particles, but it is difficult to fix the particles on the surface of the substrate or to form a single layer coating film, so that it is not easy to control the refractive index on the surface.

Further the present inventors have proposed a sol in which fine particles of composite oxide with low refractive index prepared by completely coating surfaces of porous fine particles with silica is dispersed (Refer to Japanese Patent Laid-Open Publication No. HEI 7-133105). To coat the fine particles completely, however, the step of coating the particles repeatedly or the step of subjecting the fine particles to heat processing is required, and further as a solvent such as water or alcohol is sealed in the coated particles, so that there is a limit in reduction of the refractive index. In addition, it has been found that a film or a resin plate obtained by dispersing the particles in resin or the like has weak adhesion between the resin and the particles, and further that also strength of the anti-refection film prepared with such the material as described above is rather low.

The present inventors disclosed the fact that silica particles each having an organic group directly bonded to silicon have high affinity with organic solvents or resins and are easily monodispersed in water. With the silica particles, particles hardly drop off from a mold prepared by mixing the silica particles in a resin, but it is impossible to completely prevent the particles from dropping off from the mold. Further particles with low refractive index, which can be used as a filler for adjusting a refractive index, have not been obtained.

Further even if a coating film is formed on a substrate such as glass or plastic sheet using a substance having a low refractive index such as silica fluorine resin or magnesium fluoride, when there is no mutual solubility (affinity) between the coating film made from the low refractive index substance and the substrate, the adhesiveness with the substrate is often low. In addition, the capability of preventing reflection may be insufficient according to used substrates.

DISCLOSURE OF THE INVENTION

It is an object of the present invention to provide a variety of fine particles having a structure wherein a porous composite oxide particle is coated with a porous silica-based inorganic oxide layer. It is also an object of the present invention to provide a sol with said fine particles, method for preparing the sol, and a substrate having a coating film comprising the fine particles thereon, which has a low refractive index and excellent in adhesion with a resin or the like, strength, the ability to reduce reflection and the like.

Fine particles according to the present invention are porous fine particles of composite oxide comprising silica and an inorganic oxide other than silica, wherein said fine particles are coated with a porous silica-based inorganic oxide layer having a thickness from 0.5 to 20 nm.

The maximum pore diameter of said silica-based inorganic oxide layer is preferably in the range from 0.5 to 5 nm.

The molar ratio ($MO_x/SiO_2$) is preferably in the range from 0.0001 to 0.2, when silica is expressed by $SiO_2$ and the inorganic oxide other than silica is expressed by $MO_x$.

The pore volume of said fine particles is preferably in the range from 0.1 to 1.5 cc/g and the particles further comprise a second silica coating film layer coated thereon preferably.

The fine particles include preferably an organic group directly bonded to silicon, and $S_R/S_T$, the ratio of the molar amount of silicon having the organic group directly bonded thereto ($S_R$) vs the molar amount of the total silicon ($S_T$), is preferably in the range from 0.001 to 0.9.

A method of producing fine particle dispersion sol according to the present invention comprises the steps of:

(a) preparing a dispersion liquid of core particle precursor by concurrently adding an aqueous solution of a silicate and/or an acidic silicate solution, a hydrolyte of an organic silicon compound expressed by the formula (1), and a solution of an alkali-soluble inorganic compound to an alkaline aqueous solution with the pH value of 10 or more, or to an alkaline aqueous solution with the pH value of 10 or more in which species particles are dispersed, if necessary;

(b) forming a first silica-based coating film layer on the core particle precursor by adding a silica source or an aqueous solution of the silica source and any inorganic salt other than silica to said dispersion liquid of core particle precursor; and (c) selectively removing at least a portion of elements other than silicon and oxygen from among those constituting said core particle precursor by adding an acid to said dispersion liquid;

$$R_nSiX_{(4-n)} \qquad (1)$$

[wherein R indicates a non-substituted or substituted hydrocarbon comprising 1 to 10 carbon elements; X indicates an alkoxy group containing 1 to 4 carbon elements, a silanol group, halogen, or hydrogen, and n indicates a number from 1 to 3].

The producing method according to the present invention further comprises preferably the step of forming a second silica coating film layer on said fine particles by adding an alkaline aqueous solution, an organic silicon compound expressed by the formula (2) and/or a partial hydrolyte thereof to the fine particle dispersion sol prepared in the step (c).

$$R_nSiX_{(4-n)} \qquad (2)$$

[wherein R indicates a not-substituted or substituted hydrocarbon comprising 1 to 10 carbon elements; X indicates an alkoxy group containing 1 to 4 carbon elements, a silanol group, halogen, or hydrogen, and n indicates a number from 0 to 3]

Said method further comprises preferably the step of eliminating pores in the second silica coating film layer by heating the fine particle dispersion sol under the temperature from 50° C. to 350° C.

A substrate with a coating film according to the present invention is characterized in that said coating film contains the above-mentioned fine particles and a matrix for forming a coating film.

The refractive index of said substrate is preferably 1.60 or more.

A film-coated substrate preferably comprises an intermediate coating film with the refractive index of 1.60 or more formed on a surface of the substrate having the refractive index of 1.60 or less, said coating film containing the fine particles according to the present invention and a matrix for forming a coating film thereon. The intermediate coating film contains preferably fine particles of metal oxide with the average particle diameter in the range from 5 to 100 nm by 30 to 95 weight %.

BEST MODE FOR CARRYING OUT THE INVENTION

Preferable embodiments of the present invention are described below.

(1) Fine Particles

A porous particle of composite oxide comprising silica and an inorganic oxide other than silica is used for a core of fine particle according to the present invention. The inorganic oxides available for the invention include one or more of $Al_2O_3$, $B_2O_3$, $TiO_2$, $ZrO_2$, $SnO_2$, $Ce_2O_3$, $P_2O_5$, $Sb_2O_3$, $MoO_3$, $ZnO_2$, $WO_3$. Inorganic oxides consisting of two or more compositions include $TiO_2$—$Al_2O_3$ and $TiO_2$—$ZrO_2$.

The molar ratio $MO_x/SiO_2$ of the core particle should preferably be in the range from 0.05 to 2.0, when silica is expressed by $SiO_2$ and an inorganic oxide other than silica is expressed by $MO_x$. When the molar ratio $MO_x/SiO_2$ is less than 0.05, the pore volume described later does not become fully large with the refractive index reduced insufficiently, and on the other hand, when the molar ratio $MO_x/SiO_2$ is larger than 2.0, the obtained sol has low stability, which is not preferable.

A surface of the core particle is coated with a silica-based inorganic oxide layer. The silica-based inorganic oxide layer as defined herein includes (1) a silica monolayer, (2) a monolayer of a composite oxide comprising silyica and other inorganic oxide other than silica, and (3) a dual layer comprising the layer (1) and the layer (2) above.

In this invention, it is necessary to limit the thickness of the coating film in a range from 0.5 to 20 nm. When the thickness of the coating film is less than 0.5 nm, the coating effect can hardly be achieved, and more specifically a resin (including monomer, polymer, and oligomer; this is applied also in the following description), sometimes enters in the pores of the composite oxide particles and in that case it often occurs that lowering of the refractive index described below is insufficient. Further, in the production step described below, sometimes the particles may not preserve the original forms when at least a portion of the elements other than silicon and oxygen are selectively removed from the particles, which is not preferable. On the other hand, when the thickness of the coating film is over 20 nm, sometimes it becomes difficult to form a coating layer having the appropriate pore size as described below, and it may occur that the obtained particles are not porous. In addition, selective removal of elements in the next step is likely to become difficult. Further as a solvent such as water or alcohol is sealed in the composite oxide particles, when the particles are dispersed in a resin to form a coating film, the solvent can not sufficiently be removed in the drying step, and a gas phase such as air is not, formed, so that the refractive index can not sufficiently be lowered, which is not preferable. The thickness of the coating film should preferably be in the range from 1 to 8 nm.

The coating film is required to be porous, and the maximum value of the pore size should preferably be in the range from 0.5 to 5 nm. When the maximum pore size is less than 0.5 nm, the resin can hardly enter the fine pores of the coating film, so that adhesiveness of the coating film to the resin becomes insufficient. Further as the solvent in the fine pores of the composite oxide particles does not go out of the pores when the particles are dried, the refractive index lowers insufficiently, which is not preferable. On the other hand, when the maximum pore size is larger than 5 nm, as the resin enters not only the coating film layer, but also fine pores of the composite oxide particle as core particle, lowering of the refractive index is insufficient. The maximum fine pore size should more preferably be in the range from 1 to 4.5 nm.

The fine pore volume of the composite oxide particle should preferably be in the range from 0.1 to 1.5 ml/g, and more preferably be in the range from 0.2 to 1.5 ml/g. When the fine pore volume is less than 0.1 ml/g, porous fine particles having the desirable characteristics can not be obtained, old On the other hand, when the fine pore volume is more than 1.5 ml/g, strength of the fine particles becomes lower.

The average particle diameter of the composite oxide fine particles according to the present invention is required to be in the range from 5 to 300 nm. When the average particle diameter is less than 5 nm, the volumic percentage of the coating film layer in the fine particles increases, while a percentage of the fine pores decreases. On the other hand, when the average particle diameter is over 300 nm, it becomes difficult to obtain a stable dispersion sol, and further the transparency of the coating film containing the fine particles is apt to become lower. The average particle diameter of the fine particles of the composite oxide according to the present invention should preferably be in the range from 10 to 200 nm. Therefore the average particle diameter of the core particles constituting the fine particles of the composite oxide is required to be in the range from 4.5 to 280 nm. The average fine particle diameter can be obtained by the dynamic light scattering method.

The fine particle of composite fine particle according to the present invention should preferably include an organic group directly bonded to silicon. A substituted or non-substituted hydrocarbon group having 1 to 10 carbon elements is used as the organic groups as described above, and the hydrocarbon group includes a hydrocarbon group, a carbonized halogen group, an epoxy alkyl group, an aminoalkyl group, a methacrylalkyl group, and a melcaptoalkyl group. More specifically a methyl group, a phenyl group, an isobutyl group, a vinyl group, a trifluoropropyl group, a β-(3,4 epoxy cyclohexyl) group, a γ-grycidoxy propyl group, a γ-methacryloxy propyl group, a N-β(aminoethyl) γ-aminopropyl group, a γ-aminopropyl group, a N-phenyl-γ-aminopropyl group, a γ-mercaptopropyl group and the like can be enlisted as the hydrocarbon group described above.

$S_R/S_T$, the ratio of the molar amount of silicon having the organic group directly bonded thereto ($S_R$) vs the molar amount of the total silicon ($S_T$) should preferablybe in the range from 0.001 to 0.9. When the ratio $S_R/S_T$ is less than 0.001, as the quantity of organic groups on the surface of the particle is too small, the affinity to the organic solvent or the resin is insufficient, and also lowering of the refractive index due to inclusion of the organic group is insufficient. On the other hand, when the ratio $S_R/S_T$ is over 0.9, characteristics of the organic group is shown too strongly, and aggregation of the particles in water easily occur. The ratio $S_R/S_T$ should preferably be in the range from 0.1 to 0.9.

The ratio $S_R/S_T$ is calculated as described below. A sol is dried overnight in vacuum under the temperature of 100° C., and about 5 g of powder sample obtained by removing evaporative components such as water is accurately weighted, and then is dispersed in 250 ml of 0.05 N NaOH aqueous solution, and the solution is agitated continuously for 10 hours under the room temperature. With this operation, all of the hydrolysable groups not reacted yet in the powder sample are hydrolyzed, and extracted in the water as the dispersion medium. The operations of separating the powder sample in said dispersion medium by means of ultracentrifugation and washing the separated powder sample with water, are repeatedly performed, and then the content of total carbon in the powder sample dried for 5 hours under 200° C. is measured by means of the ultimate analysis, and the molar amount of silicon having the organic group directly bonded thereto ($S_R$) is calculated from the average carbon numbers of the organic group used as the source, and finally the ratio to the molar amount of the total silicon ($S_T$) is calculated.

(2) Sol Having Fine Particles Dispersed

The fine particle dispersion sol according to the present invention are dispersed in a dispersion medium such as water, an organic solvent, and a mixture solvent of water and any organic solvent. There is not specific limitation over the organic solvent to be used in this invention, and organic solvents used in the conventional types of organic sol including monovalent alcohol such as methanol and ethanol, and polyvalent alcohol such as ethylene glycol and propylene glycol may be used in this invention.

The sol described above can be used for various purposes, and when it is necessary to condense the sol, it is better to remove a portion of alkali metal ions, alkali earth metal ions, and ammonium ions previously, and then to condense the sol for obtaining more stable condensed sol. Any known method such as ultrafiltration may be used for removing the ions.

(3) Method for Preparing the Fine Particle Dispersion Sol

The method for preparing the sol according to the present invention comprises the steps (a) to (C) described above. The production method is described in detail below.

Step (a) [Preparation of a Dispersion Liquid in Which Precursors of Core Particles are Dispersed]

One or more silicates selected from the group consisting of an alkali metal silicate, an ammonium silicate, and a silicate of organic base are preferably used as a silicate. Sodium silicate (water glass) or potassium silicate can be enlisted as the alkali metal silicate; and a quarternary ammonium salt such as tetraethyl ammonium salt and amines such as monoethanol amine, diethanolamine, and triethanol amine as the organic base; and further an alkaline solution in which ammonia, quarternary ammonium hydroxide, or any amine compound is added in a silicic acid as the silicate of ammonium salt or organic base respectively.

As the acidic silicic acid solution, a silicic acid solution obtained by processing an alkaline silicic acid solution with a positive ion exchange resin to remove alkali may be used, and the acidic silicic acid solution with pH in the range from 2 to 4 and about 7 weight percent or less of $SiO_2$ concentration is preferable.

As the organic silicon compound shown in the formula (1) above, there can be enlisted methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxy-silane, isobutyltrimethoxysilane, vinyltrimethoxysilane, vinyltriethoxysilane, vinyltris(β-methoxyethoxy)silane, 3,3,3-trifluoropropyl-trimethoxysilane, methyl-3,3,3-torifluoropropyl-dimethoxysilane, β-(3,4-epoxycyclohexyl) ethyltrimethoxysilane, γ-glycidoxytripropyl-trimethoxysilane, γ-glycidoxyprbpylmethyldiethoxysilane, γ-glycidoxypropyltriethoxysilane, γ-methacryloxy-propylmethyldimethoxysilane, γ-methacryloxypropyl-trmimethoysilane, γ-methacryloxyprpylmethyidie-thoxysilane, γ-methacryloxypropyltriethoxysilane, N-β (aminoethyl)-γ-aminopropylmethyldimethoxysilane, N-β (aminoethyl)-γ-aminopropyltrimethoxysilane, N-β (aminoethyl)-γ-aminopropyltriethoxyisilane, γ-aminopropyltrimethoxysilane, γ-amino-propyltriethoxysilane, N-phenyl-γ-aminopropyl-trimethoxysilane, γ-mercaptopropyltrimethoxysilane, trimethylsilanol, methyltrichlorosilane, methyldichlorosilane, dimethyldichlorosilane, trimethylchlorosilane, phenyltrichlorosilane, diphenyldichlorosilane, vinyltrichlorosilane, trimethylbromosilane, and diethylsilane, or the like.

As the organic silicon compounds described above are not so hydrophilic, it is preferable to previously hydrolyze the compounds so that the compounds can homogeneously be mixed in the reaction system. For hydrolyzing the organic silicon compounds, any well-known method may be used. When a hydroxide of an alkali metal, ammonia water or amine which are all basic is used as a catalyst for the hydrolysis, after completion of the hydrolysis, the basic catalyst is removed, and the remaining acidic solution may be used. Further, when a hydrolyte is prepared by using an acidic catalyst such as an organic acid or an inorganic acid, it is preferable to remove the acidic catalyst, after completion of the hydrolysis, by means of, for instance, ion exchanging. It should be noted that the obtained hydrolyte of the organic silicon compound is used in the form of aqueous solution. The aqueous solution as defined herein indicates a state in which the hydrolyte is not gelled in the opaque state and it keeps the transparency.

It is preferable to use an alkali-soluble inorganic compound as a source for the inorganic oxide, and the inorganic compounds include, but not limited to an alkali metal salt, an alkali earth metal salt, an ammonium salt, a quarternary ammonium salt of the oxo acid of the above-described metals or non-metals, and more specifically sodium aluminate, sodium tetraborate, zirconyl carbonate ammonium, potassium antimonate, potassium stannate, sodiumaluminosilicate, sodiummolybdate, ceriumnitrate ammonium, and sodium phosphate.

To prepare a dispersion liquid of the core particle precursor, previously an alkaline aqueous solution of the inorganic compound is prepared discretely, or a mixture aqueous solution is prepared, and this aqueous solution is gradually added to an alkaline aqueous solution with pH 10 or more according to the target ratio of the composite oxide.

It is preferable to adjust addition rate of the silica source, organic silicon compound and inorganic compound to be added in the alkaline aqueous solution so that, when the silica component is expressed with $SiO_2$ and the inorganic compounds other than silica with $MO_x$, the molar ratio of $MO_x/SiO_2$ will be in the range from 0.05 to 2.0. When the molar ratio of $MO_x/SiO_2$ is less than 0.05, the fine pore volume described before is not sufficiently large, and on the other hand, when the molar ratio of $MO_2/SiO_2$ is over 2.0, the stability of the sol obtained becomes lower. Further it is preferable to adjust the addition rate so that the molar ratio of $S_R/S_T$ is in the range from 0.001 to 0.9.

Although the pH value of the solution changes simultaneously when the components are added to the solution, any specific operations for limiting the pH value in a prespecified range is not required in the present invention. The pH value of the aqueous solution is finally set to a particular pH value decided by the types and the mixing ratio of the organic silicon compound and the inorganic oxide. For controlling pH with in a prespecified range, sometimes an acid is added, but in this case, a salt of a metal as a source for the composite oxide is generated by the added acid, and because of this salt, sometimes the stability of the dispersion liquid dispersed core particles may drop. It should be noted that there is not any specific limitations over the addition rate of the aqueous solution.

In the production method according to the present invention, it is possible also to use a dispersion liquid of species particles as a starting material when preparing a dispersion liquid of core particles. In this case, fine particles of inorganic oxide such as $SiO_2$, $Al_2O_3$, $TiO_2$, $ZrO_2$, $SnO_2$ and $CeO_2$, or of composite oxide of these inorganic oxides such as $SiO_2$—$Al_2O_3$, $TiO_2$—$Al_2O_3$, $TiO_2$—$ZrO_2$, $SiO_2$—$TiO_2$, $SiO_2$—$TiO_2$—$Al_2O_3$ are used as the species particles, and generally sols of these inorganic oxides or composite oxides may be used. The dispersion liquid of species particles can be prepared by any known methods in the art. The sol can be obtained, for instance, by adding an acid or an alkali to a metal salt corresponding to any of the inorganic oxides, a mixture of metal salts, or metal alkoxyde to hydrolyze the material and curing the hydrolyte according to the necessity. It is needless to say that the sol obtained by the production method according to the present invention may be used as a dispersion liquid of species particles.

The aqueous solution of the compound is added with agitation to the dispersion liquid of species particles with the pH having been adjusted to 10 or more, in the same way as that for adding it to the alkaline aqueous solution. In this case also, the pH control over the dispersion liquid is not performed and the PH is left in the uncontrolled state. When the composite oxide particles are grown from the species particles, it is easy to control the particle diameter of the grown particles, and particles with substantially uniform size can be obtained. The addition rate of the silica source, the organic silicon compound and the inorganic oxide to be added in the dispersion liquid of species particles should be in the same ranges as those in addition thereof to the alkaline aqueous solution.

The silica source, the organic silicon compound and the inorganic oxide source have high solubility in alkali side respectively. When two types of solutions are mixed in the pH area where the solubility of these compounds is high, the solubility of oxo acid ions such as, silicate ions and aluminate ions becomes lower, and these composite compounds are deposited and grow up to colloidal particles, or are deposited on the species particles, which leads to growth of the particles. Therefore, the pH control as required in the conventional technology is not always necessary in the deposition and the growth of the colloidal particles in this invention.

It is also possible to modify a surface of the particles by giving reactivity to an organic group to be introduced into the fine particles of composite oxide containing the target organic group and making the organic group react to a desired compound.

step (b) [Formation of First Silica-based Coating Film Layer]

As the silica source to be added, a silicate solution obtained by de-alkalizing an alkali metal salt of silica (water glass) is especially preferable. When the dispersion medium of the core particle precursor is water itself or the ratio of water against the organic solvent is high in the dispersion medium, it is possible to use the silicate solution for coating the particles. When a silicate solution is used, a specified quantity of silicate solution is added in the dispersion liquid, and at the same time alkali is added to have the silicate solution deposited on a surface of the core particles.

A hydrolysable organic silicon compound may also be used as the silica source. As the hydrolysable organic silicon compound, alkoxysilanes generally expressed by the formula $R_nSi(OR')_{4-n}$ [R, R': hydrocarbon groups such as alkyl group, allyl group, vinyl group, acryl group; n=0, 1, 2, or 3] may be used, and tetraalkoxysilanes such as tetramethoxysilane, tetraethoxysilane, and tetraisopropoxysilane are especially preferable.

When adding the silica source, a solution obtained by adding a small quantity of alkali or acid as a catalyst to a mixture solution of any of the alkoxysilanes, deionized water and alcohol, is added to a dispersion liquid of the core particle precursor to hydrolyze the alkoxysilanes, and the resultant silicate polymer is deposited on a surface of the precursor. In this step, the alkoxysilanes, alcohol and catalyst may be added at the same time to the dispersion liquid. As the alkaline catalyst, ammonia, hydroxides of alkali metal, or amines may be used. As the acidic catalyst, various types of inorganic acids or organic acids may be used. Further it is also possible to use both alkoxysilanes and the silicate solution for coating the particles.

Further for forming the first coating film layer comprising silica and inorganic oxide other than silica, in the step of forming the silica coating film layer, it is required only to add a source of any inorganic oxide other than silica. The inorganic oxide source may be added either before or after addition of the silica source, but it should preferably be added at the same time when the silica source is added. As for the addition ratio in this step, the molar ratio of the oxide other than that of silica against silica should preferably be in the range from 0.5 to 20.

When the molar ratio is less than 0.5, the pore volume and the pore diameter of the first coating film layer generated after a portion of the components other than silica is removed in the next step (c) are too small, and consequently the adhesiveness to the resin becomes insufficient. When the molar ratio is over 20, the pore diameter of the first coating film layer is too large, and the resin comes into and is solidified in the fine pores, so that the effect of lowering the refractive index may becomes smaller.

It should be noted that addition amounts of the silica source rand the source of the oxide other than silica must be sufficient to form a coating film layer with the thickness in the range from 0.5 to 20 nm. Further this first coating film layer may comprise a plurality of layers including the silica coating film layer and the coating film layer of the composite oxide comprising silica and any oxide(s) other than silica.

Step (C) [Selective Removal of Elements]

It is possible to increase pore volume of the core particle precursor forming the first coating film layer by selectively removing at least a portion of elements other than silicon and oxygen from those constituting the core particle precursor forming the first coating film layer.

To remove a portion of the elements other than silicon and oxygen, it is preferable to dissolve and remove the elements, for instance, by adding a mineral acid or an organic acid to the dispersion liquid of the fine composite oxide particles forming the silica-based coating film layer, or by contacting a positive ion exchange resin to the dispersion liquid for removing the elements by means of ion exchanging. After the elements are removed, the molar ratio of $MO_x/SiO_2$ should preferably be in the range from 0.0001 to 0.2.

The dispersion liquid from which some elements have been selectively removed can be washed by any known method such as the ultrafiltration. In this case, a sol in which fine particles are dispersed with high stability can be obtained by performing ultrafiltration after a portion of alkali metal ions, alkali earth metal ions, ammonium ions or the like in the dispersion liquid is removed beforehand. Further an organic solvent dispersion sol can be obtained by substituting the dispersion medium with any organic solvent according to the necessity.

In another production method of sol according to the present invention, further the step of forming a second silica coating film layer is added.

As the organic silicon compound expressed by the formula (2) above to be used in this step, any of the same organic silicon compounds as those used in the step (b) may be used. When an organic silicon compound with n of 0 in the formula (2) is used, the compound may be used as it is, but in an organic silicon compound with n of 1 to 3 in the same formula, it is preferable to use the same partially hydrolyzed organic silicon compound as that used in the step (a).

By forming the second silica coating film layer, it is possible to adjust thickness of the coating film layer, and it is possible to control the final thickness of the coating film layer within the range from 0.5 to 20 nm.

When the organic silicon compound with n of 1 to 3 in the formula (2) is used for forming the second silica coating film layer, it is possible to obtain a composite oxide fine particle dispersion sol with high dispersibility in an organic solvent and high affinity with a resin. Because of the characteristics, although generally surface processing with the silane coupling agent or the like is required, as the dispersibility in an organic solvent and affinity with a resin are excellent, the processing as described is not required in this case.

In still another production method of the fine particle dispersion sol according to the present invention, further a heat treatment step is added.

Namely, an alkaline aqueous solution is added to the dispersion sol of the fine particles of composite oxide containing the organic group with the second silica coating film formed thereon according to the necessary to control the pH of the dispersion sol preferably within the range from 8 to 13, and then the dispersion sol is subjected to heat treatment. The heat treatment in this step should preferably be performed under the temperature in the range from about 50° C. to 350° C. production and more preferably in the range from 100° C. to 300° C. By this heat treatment, it is possible to eliminate pores of the coating film layer without losing porosity of the core particles, and the sol in which sealed type of composite oxide fine particles with the core particles sealed with the silica-based coating film and dispersed can be obtained. In the heat treatment, the dispersion sol of fine particles of composite oxide containing the organic group obtained in the step (c) may previously be diluted or condensed for the heat treatment. Finally the dispersion sol subjected to the heat treatment may be washed like in the step (c).

(4) Film-coated Substrate

The film-coated substrate according to the present invention is described below. This substrate is such a material as glass, polycarbonate, acrylic resin, plastic sheet such as PET or TAC, plastic film, or plastic panel, and has a coating film formed on a surface thereof, and can be obtained by applying a coating liquid described later by any of known methods such as the dip method, the spray method, the spinner method, or the roll coat method, and then drying and further sintering the coating film, if necessary.

The coating liquid described above is a mixture liquid of the sol and a matrix for forming a coating film, and sometimes an organic solvent may be mixed, if required.

The matrix for forming a coating film is a component capable of forming a coating film on a surface of the substrate, and such a material as a resin suited to the conditions such as adhesiveness to the substrate, hardness, and adaptability to being be applied and spread on a surface of the substrate can be selected for use, and materials available as the matrix include, but not limited to polyester resin, acrylic resin, urethane resin, vinyl chloride resin, epoxy resin, melamine resin, fluoride resin, silicone resin, butyral resin, phenol resin, vinyl acetate resin, ultraviolet curing resin, electron beam curing resin, emulsion resin, water-soluble resin, hydrophilic resin, each of which has been used in the art, or a mixture of these resins, and further copolymers or denatured ones of these resins, and hydrolysable organic silicon compounds such as the alkoxysilanes described above.

When a resin for coating is used as the matrix, for instance, an organic solvent dispersion sol in which water as the dispersion medium is substituted by an organic solvent such as alcohol, or an organic solvent prepared by treating the fine particles described above with any known coupling agent and then dispersing the treated fine particles in an organic solvent and a resin for coating are diluted with an appropriate organic solvent, and the resultant diluted mixture solution may be used as a liquid for coating.

On the other hand, when a hydrolysable organic silicon compound is used as the matrix, for instance, a partially hydrolysed alkoxysilane is obtained by adding water and an acid or an alkali as a catalyst to a mixture solution of alkoxysilane and alcohol, then the sol is mixed in the partially hydrolysed alkoxysilane with the mixture diluted with an organic solvent according to the necessity, and the resultant diluted mixture solution can be used as the coating liquid.

A weight ratio of the fine particles and the matrix in the coating liquid should preferably be in the range from 1/99 to 9/1. When the weight ratio is over 9/1, the strength of the coating film is insufficient and is not appropriate for practical use, and when the weight ratio is less than 1/99, there appear no effects even when the fine particles are added.

A refractive index of the coating film formed on the surface of the substrate as described above varies according to the mixing ratio of the fine particles and the resin or other components and the refractive index of the resin used for the purpose, but is generally low and in the range from 1.28 to 1.50. It should be noted that the refractive index of the fine particle itself according to the present invention is in the range from 1.20 to 1.44.

The fine particles according to the present invention have low refractive index, because even if dispersion medium enters pores of the fine particles, the dispersion medium goes out of the pores and the pores become empty when the coating film is dried, and because the pore diameter of the silica-based coating film layer is controlled within the range described above, so that components such as a resin used for forming the coating film are retained within the silica-based coating film layer, and then pores in the silica-based coating film layer are blocked after the resin is cured with porosity inside the particles maintained.

On the other hand, in the porous fine particles based on the conventional technology as described above (as disclosed in Japanese Patent Laid-Open Publication No. HEI 5-132309), components such as a resin used for forming a coating film enter to pores, the low refractive index as achieved with the present invention can not be obtained. Further the refractive index of the fine particles according to the present invention is lower even as compared to that of the fine particles with a solvent shielded in fine pores thereof obtained by coating the surface of the porous fine particles completely (as disclosed in Japanese Patent Laid-Open Publication No. HEI 7-133105).

In the film-coated substrate, when the refractive index of the substrate is less than 1.60, it is recommended to form a coating film with the refractive index of 1.60 or more (this coating film is sometimes described as intermediate coating film hereinafter) on the surface of the substrate and then form a coating film containing the fine particles according to the present invention thereon. When the refractive index of the intermediate coating film is over 1.60, the difference from the refractive index of the coating film containing the fine particles according to the present invention (which is sometimes described as surface coating film hereinafter) is large, so that a film-coated substrate with excellent anti-reflection capability can be obtained. The refractive index of the intermediate coating film can be adjusted by changing a type of fine particles of metal oxide to be used, a mixing ratio between the metal oxide and resin or other components, and a refractive index of a resin to be used.

A coating liquid for forming the intermediate film is a mixture solution of metal oxide particles and a matrix for forming a coating film thereon, and an organic solvent may be mixed according to the necessity. As the matrix for forming a coating film thereon, the same matrix as that for the coating film containing fine particles according to the present invention may be used, and by using the same matrix for forming a coating film, it is possible to obtain a film-coated substrate with excellent adhesiveness between the two types of coating films described above.

The weight ratio between the fine particles of metal oxide and the matrix in a coating liquid for forming the intermediate coating film (fine particles/matrix) should preferably be in the range from 30/70 to 95/5, and more specifically from 50/50 to 80/20. When the weight ratio is over 95/5, strength of the coating film is insufficient, and further the adhesiveness with the substrate is not sufficient so that the coating film is not suited to actual use, and on the other hand, when the weight ratio is less than 30/70, the refractive index of the intermediate film is not over 1.60, so that the difference from that of the surface coating film is not so large and its anti-reflection capability is not sufficient.

As the fine particles of metal oxide described above, it is preferable to use one with the refractive index of 1.60 or more, and more preferably with the refractive index of 1.70 or more, and the metal oxides which can be used for that purpose include, but not limited to, titanium oxide (2.50), zinc oxide (2.0), zirconium oxide (2.20), cerium oxide (2.2), tin oxide (2.0), thallium oxide (2.1), bariumtitanate (2.40), aluminum oxide (1.73), magnesium oxide (1.77), yttrium oxide (1.92), stibium oxide (2.0), and indium oxide (2.0). Of these oxides, conductive fine particles of titanium oxide, cerium oxide, tin oxide, stibium oxide, zirconium oxide, indium oxide or the like, and the conductive fine particles in which different types of elements such as stibium, tin, fluorine or the like are doped are preferable because the contained coating film has, in addition to the anti-reflection capability, the anti-electrification effect. When the refractive index of metal oxide fine particles is less than 1.6, the refractive index of the obtained intermediate coating film is not over 1.60, so that the difference in refractive index from the surface coating film is not so large and its anti-reflection capability is not sufficient.

The average diameter of the fine particles of metal oxide should preferably be in the range from 5 to 100 nm, and more preferably from 10 to 60 nm. It is impossible to obtain particles with the average particle diameter of less than 5 nm, and when the average particle diameter is over 100 nm, scattering of visible light becomes remarkable and transparency of the coating film becomes lower, which is not preferable.

When the coating liquid for forming the intermediate coating film is prepared with the fine particles of metal oxide described above, it is preferable to use the fine particles of metal oxide as a sol in which the fine particles are dispersed in a dispersion medium, and a water dispersion sol in which the fine particles are dispersed in water, an organic solvent dispersion sol in which the fine particles are dispersed in an organic solvent such as alcohol, and an organic solvent sol prepared by treating the fine particles with any known coupling agent and then dispersing the fine particles in an organic solvent and a resin for paint are diluted with an appropriate organic solvent to obtain a coating liquid. Further a surfactant may be added to the coating liquid for improving such characteristics as dispersibility and stability.

The two-layered film-coated substrate can be obtained by applying a coating liquid for forming an intermediate coating film, drying the coating film, forming the intermediate coating film according to the necessity, then applying a coating liquid for to form the surface coating film in the same way as that forming the intermediate film, drying the surface coating film, and sintering the substrate, if necessary. The two-layered film-coated substrate can also be obtained by applying the coating liquid for forming the intermediate coating film, drying the intermediate coating film, then applying the coating liquid for forming a surface coating film on the intermediate coating film, and then sintering the substrate, if necessary.

The present invention is described in further details with reference to the examples below.

EXAMPLE 1

Production of a Composite Oxide Sol

A mixture of 100 g silica sol with average particle diameter of 5 nm and $SiO_2$ concentration of 20 weight % and 190 g deionized water was heated to 80° C. The pH value of this reaction mother liquid is 10.5, and 9000 g of 1.5 weight % sodium silicate aqueous solution as $SiO_2$ and 9000 g of 0.5 weight % sodium aluminate aqueous solution as $Al_2O_3$ were added to the mother liquid at the same time. During this step, the temperature of the reaction liquid was kept at 80°0 C. The pH of the reaction liquid rose to 12.5 immediately after addition of the compounds above, and then changed little subsequently. After addition of the compounds, there action liquid was cooled down to the room temperature, washed with a ultrafiltration membrane and condensed to give $SiO_2$—$Al_2O_3$ composite oxide particle precursor sol (A) with the solid component concentration of 20 weight %.

1,700 g deionized water was added to 500 g of this precursor sol (A), and the mixture solution was heated to 98° C., and then 2,000 g silicate solution (with the $SiO_2$ concentration of 3.5 weight %) obtained by de-alkalizing the sodium silicate aqueous solution with a positive-ion exchange resin, was added over 5 hours keeping the temperature described above to give the $SiO_2$—$Al_2O_3$ composite oxide particle precursor sol (B) coated with silica.

This sol was washed with a an ultrafiltration membrane to give a sol with the solid component concentration of 13 weight %, and 1,125 g deionized water was added to 500 g of this sol and further concentrated hydrochloric acid (35.5%) to adjust the pH value to 1.0 for removing aluminum.

Then 10 liters of hydrochloric acid aqueous solution with pH 3 and 5 liters of deionized water were added to remove the dissolved aluminum salt with an ultrafiltration membrane, and a dispersion sol (C) of the $SiO_2$—$Al_2O_3$ composite oxide particle sol (P1) coated with silica was obtained.

The molar ratio $MO_x/SiO_2$, the average particle diameter, pore volume, the thickness and the maximum pore diameter of the coating film layer and the refractive index of the silica-coated composite oxide particles (P1) are shown in Table 1. Herein the average particle diameter is measured by the dynamic light scattering method, while the pore volume of the particle is measured by the nitrogen absorption method. The thickness of the coating film layer was calculated from the particle diameter before coating obtained by the dynamic light scattering method, weight and real specific weight of the oxide or composite oxide used for forming the coating film layer, and the volume of the coating film layer calculated assuming that the pore volume of the coating film layer was 0.5 ml/g. The specific weight of the composite oxide was calculated from the composition ratio, assuming that the specific weight of $SiO_2$ was equal to 2.6 and that of $Al_2O_3$ was equal to 3.2. Further the maximum pore diameter of the coating film layer was measured with the automatic pore distribution meter (Autosorb-6 produced by Quanta Chrome Corp.).

The refractive index of particles in the sol was measured as described below.

(1) The dispersion sol of a porous composite oxide is poured into an evaporator, and its dispersion medium was evaporated.

(2) The resultant product is dried under the temperature of 120° C. until it turns into powder.

(3) Two or three drops of standard refraction liquid with a known refractive index are dropped onto a glass plate, and said powder is mixed in the liquid.

(4) The above operation (3) is performed with various types of standard refraction liquids, and a refractive index of the standard refraction liquid was considered as that of the fine particles when the mixture solution (in the paste-like state in most cases) becomes transparent.

Production of a Film With Low Reflection Coefficient

The composite oxide sol (C) was passed through an ultrafiltration membrane and water in the dispersion medium was substituted with ethanol. 50 g of this ethanol sol (with the solid component concentration of 5 weight %), 3 g acryl resin (Hitaloid 1007 produced by Hitachi Kasei), and 47 g of 1/1 (weight ratio) mixture solvent of isopropanol and n-butanol, were fully mixed with each other to prepare a coating film. This coating liquid was applied on a PET film by the bar-coater method, and dried for one minute under the temperature of 80° C. to give a film with low reflection coefficient (F1). The total light beam transmittance, the haze, the reflection coefficient for a light beam with the wavelength of 550 nm, and the refractive index of the coating films for each of this film (F1) and the PET film with the coating liquid not applied thereon (F0) are shown in Table 2. The total light beam transmittance and haze were measured with a haze meter (from Suga Shikenki (K.K)), while the reflection coefficient was measured with a spectrophotometer (from Nihon Bunko Sha, Ubest-55). Further the refractive index was measured with an elipsometer (from ULVAC Corp.: EMS-1).

The adhesiveness was assessed by giving 11 parallel flaws at a space of 1 mm therebetween in the vertical and horizontal directions with a knife to a surface of the film with low reflection coefficient (F1) to make 100 blocks, adhering a tape thereto, then separating the tape therefrom and counting a number of blocks where the coating film is not separated together with the tape and remains there, and grading the count to the following 4 grades. The result is shown in Table 2.

| | |
|---|---|
| 95 or more blocks remained: | ⊙ |
| 90 to 94 blocks remained: | ○ |
| 85 to 89 blocks remained: | Δ |
| 84 or less blocks remained: | X |

Production of Glass With a Low Reflection Coefficient

A small quantity of hydrochloric acid was added to a mixture solution of 20 g ethylsilicate (with the $SiO_2$ concentration of 28 weight %), 45 g ethanol, and 5.33 g deionized water, to give a matrix containing partially hydrolysed ethylsilicate. 16.7 g of the ethanol sol (with the solid component concentration of 18 weight %) in which the solvent of the composite oxide sol (C) was substituted with ethanol, was added to this matrix, to prepare a coating liquid.

This coating liquid was applied on a surface of a transparent glass plate by the spinner method under the conditions of 500 rpm for 10 seconds, and then was heated for 30 minutes under the temperature of 160° C. to obtain glass with a low reflection coefficient (G1). The total light beam transmittance, the haze, the reflection coefficient for a light beam with the wavelength of 550 nm, and the refractive index of the coating films for each of this glass (G1) and glass not coated with this coating liquid (G0) are shown in Table 2.

EXAMPLE 2

Production of a Composite Oxide Sol 1,900 g of deionized water was added to 100 g of the dispersion sol (C) of the composite oxide particle (P1) coated with silica obtained in Example 1, and the mixture solution was heated to 95° C. Then particle growth was performed using the fine particle (P1) as the core by gradually adding, maintaining this temperature, 27,000 g of a sodium silicate aqueous solution (with the concentration of 1.5 weight % as $SiO_2$) and a sodium aluminate aqueous solution (with the concentration of 0.5 weight % as $Al_2O_3$) concurrently. After completion of addition, the mixture solution was cooled down to the room temperature, washed with a an ultrafiltration membrane, and further condensed to give a sol (D) of $SiO_2$—$Al_2O_3$ composite oxide precursor coated with the silica-alumina with the solid component concentration of 20 weight %.

500 g of this composite oxide precursor sol (D) was sampled to perform de-aluminizing treatment in the way like that in Example 1, and the dispersion sol (E) of the $SiO_2$—$Al_2O_3$ composite oxide particle (P2) coated with silica as shown in Table 1 was obtained.

Production of a Film With a Low Reflection Coefficient

The film with a low reflection coefficient (F2) was obtained in the same way as that in Example 1 excluding the point that the composite oxide sol (E) was used in place of the composite oxide sol (C)

Production of Glass With a Low Reflection Coefficient

Glass with a low reflection coefficient (G2) was prepared in the same way as that in Example 1 excluding the point that the composite oxide sol (E) was used in place of the composite oxide sol (C).

EXAMPLE 3

Production of a Composite Oxide Sol

A $SiO_2$—$SnO_2$ composite oxide precursor sol [H] with the solid component concentration of 20 weight % was obtained in the same way as that in Example 1 excluding the point that 9,000 g of 0.5 weight % potassium stannate aqueous solution as $SnO_2$ was used in place of the sodium aluminate aqueous solution used in Example 1. Further the sol (H) was subjected to treatments for removing Sn and also for coating in the same way as that in Example 1, and the dispersion sol (I) of the $SiO_2$—$SnO_2$ composite oxide particles (P3) shown in Table 1 was obtained.

Production of a Film With a Low Reflection Coefficient

The film with a low reflection coefficient (F3) was obtained in the same way as that in Example 1 excluding the point that the composite oxide sol (I) was used in place of the composite oxide sol (C).

Production of Glass With a Low Reflection Coefficient

Glass with a low reflection coefficient (G3) was obtained in the same way as that in Example 1 excluding the point that the composite oxide sol (I) was used in place of the composite oxide sol (C)

EXAMPLE 4

Production of a Composite Oxide Sol 500 g of the $SiO_2$—$Al_2O_3$ composite oxide particle precursor sol (A) obtained in Example 1 was heated to 90° C., and then 3,000 g of silicate solution (with the $SiO_2$ concentration of 3.5 weight %) obtained by de-alkalizing the sodium silicate aqueous solution with a positive-ion exchange resin and 100 g aluminate aqueous solution (with the $Al_2O_3$ concentration of 3.5 weight %) were added over 2 hours to the sol keeping the temperature to give a sol (J) of the $SiO_2$—$Al_2O_3$ composite oxide particle precursor particles coated with silica-alumina.

This sol was washed with an ultrafiltration membrane to obtain a sol with the solid component concentration of 13 weight %, and 1,125 g deionized water was added to 500 g of this sol, and concentrated hydrochloric acid (35.5%) was dropped further to the sol to adjust the pH to 1.0 for de-alkalization. Then 10 liters of hydrochloric aqueous solution with pH 3 and 5 liters of deionized water were added to the sol to remove the dissolved aluminum salt with an ultrafiltration membrane, and thus a dispersion sol (K) of $SiO_2$—$Al_2O_3$ composite oxide particle (P4) coated with silica-alumina was obtained.

Production of a Film With a Low Reflection Coefficient

A film with a low reflection coefficient (F4) was obtained in the same way as that in Example 1 excluding the point that the composite oxide sol (K) was used in place of the composite oxide sol (C).

Production of Glass With a Low Reflection Coefficient

Glass with a low reflection coefficient (G4) was obtained in the same way as that in Example 1 excluding the point that the composite oxide sol (K) was used in place of the composite oxide sol (C).

CONTROL 1

Production of a Composite Oxide Sol

A sol (A) of the $SiO_2$—$Al_2O_3$ composite oxide particle precursor was obtained like in the same way as that in Example 1. 1,300 g deionized water was added to t his 325 g of this sol (A), and further concentrated hydrochloric acid (35.5%) was dropped to adjust the pH value to 1.0 to remove aluminum.

Then 10 liters of hydrochloric aqueous solution with pH 3 and 5 liters of deionized water were added to the sol to remove the dissolved aluminum salt with an ultrafiltration membrane, and a dispersion sol (L) of the $SiO_2$—$Al_2O_3$ composite oxide particle (P'1)was obtained.

Production of a Film With a Low Reflection Coefficient

A film with a low reflection coefficient (F'1) was obtained in the same way as that in Example 1 excluding the point that the composite oxide sol (L) was used in the composite oxide sol (C).

Production of Glass With a Low Reflection Coefficient

Glass with a low reflection coefficient (G'1) was obtained in the same way as that in Example 1 excluding the point that the composite oxide sol (L) was used in the composite oxide sol (C).

CONTROL 2

Production of a Composite Oxide Sol

Like in Control 1, a dispersion sol (L) of the $SiO_2$—$Al_2O_3$ composite oxide particle (P'1) was prepared in the same way as that in Example 1, a mixture of 1500 g of this sol, 500 g deionized water, 1750 g ethanol and 626 g of 28% ammonia water was heated to 35° C., and then 104 g ethylsilicate (with the $SiO_2$ concentration of 28 weight %) was added to this mixture to coat a surface of the composite oxide particle (P'1) with a hydrolysed condensate of ethylsilicate. Then, the condensate was condensed with an evaporator to the solid component concentration of 5 weight %, 15% ammonia water was added to adjust the pH value to 10, the mixture was heated for two hours under the temperature of 180° C. with, an autoclave, and thus a dispersion sol (M) of the $SiO_2$—$Al_2O_3$ composite oxide particle (P'2) completely coated with silica was obtained.

Production of a Film With a Low Reflection Coefficient

A film with a low reflection coefficient (F'2) was prepared in the same way as that in Example 1 excluding the point that the composite oxide sol (M) was used in the composite oxide sol (C).

Production of Glass With a Low Reflection Coefficient

Glass with a low reflection coefficient (G'2) was prepared in the same way as that in Example 1 excluding the point that the composite oxide sol (M) was used in the composite oxide sol (C).

EXAMPLE 5

Production of a Film-coated Resin Substrate With a Low Reflection Coefficient The dispersion sol (I) of the $SiO_2$—$Al_2O_3$ composite oxide particle (P3) prepared in Example 3 was passed through an ultrafiltration membrane to adjust the solid component concentration to 20 weight %, and 25 g of this sol, 5 g of UV resin (produced by Dainihon Inki (K.K): Unidic V5500), and 70 g of ethanol were fully mixed to prepare a coating liquid for forming a surface coating film. Further 20 g of colloidal particles of titanium oxide (produced by C.C.I.C.: Optlake 1130Z with the refractive index of 2.2, average particle diameter of 20 nm, and concentration of 20 weight %), 5 g of UV resin (produced by Daihinon Inki (K.K): Unidic V5500), and 11 g of ethanol were fully mixed to prepare a coating liquid for forming an intermediate coating film.

The coating liquid for forming an intermediate coating film is applied to an acrylic plate (produced by Mitsubishi Layon (K.K); Acrylite with the refractive index of 1.49) with a bar-coater, and was dried for one minute under the temperature of 70° C. to prepare a resin substrate coated with an intermediate coating film. The refractive index of the intermediate coating film was 1.64. Then the coating liquid for forming a surface coating film prepared above was applied with a bar-coater and then dried for one minute under the temperature of 70° C. and cured by irradiating a light beam from a high voltage mercury lamp (80 w/cm) for one minute, to give a resin substrate (R1) with two layers of coating films formed thereon.

The total light beam transmittance, the haze, and the reflection coefficient for a light beam with the wavelength of 550 nm of the resin substrate (R1) are shown in Table 2. The refractive index of the surface coating film was measured by forming a surface coating film directly on the acrylic plate without forming an intermediate coating film and measuring the refractive index with an elipsometer (made by ULVAC Corp.: EMS-1), and the result is shown in Table 2.

EXAMPLE 6

Production of a Film-coated Resin Substrate With a Low Reflection Coefficient The dispersion sol (C) of the $SiO_2$—$Al_2O_3$ composite oxide particles (P1) prepared in Example 1 was passed through an ultrafiltration membrane to adjust the solid component concentration to 20 weight %, and 50 g of this sol, 5 g acrylic resin (produced by Hitachi Kasei (K.K): Hitaloid 1007), and 70 g of ethanol were fully mixed together, to prepare a coating liquid for forming a surface coating film. Further 20 g of colloidal particles of titanium oxide (produced by C.C.I.C.: Optlake 1130Z with the refractive index of 2.2, average particle diameter of 20 nm, and concentration of 20 weight %), 5 g of UV resin (Unidic V5500 produced by Dainihon Inki), and 75 g of isopropyl alcohol were fully mixed together, to prepare a coating liquid for forming an intermediate coating film.

This coating liquid for forming an intermediate coating film (produced by Mitsubishi Rayon (K.K): Acrylite with the refractive index of 1.49) was applied by the dipping method, and was dried for one minute under the temperature of 70° C., to prepare a resin substrate with an intermediate coating film coated thereon. The refractive index of the intermediate coating film was 1.80. Then the coating liquid for forming a surface coating film prepared above was applied with a bar-coater and dried for one minute under the temperature of 70° C., and then was cured by irradiating a light beam from a high voltage mercury lamp (80 W/cm) for one minute, to give a resin substrate (R2) with two layers for coating films formed thereon.

The total light beam transmittance, the haze, the reflection coefficient of a light beam with the wavelength of 550 nm of the resin substrate (R2) are shown in Table 2. It should be noted that the refractive index of the surface coating film was measured by forming a surface coating film directly on an acrylic plate without forming an intermediate coating film and measuring a refractive index thereof with an elipsometer (made by ULVAC Corp.: EMS-1), and the result is shown in Table 2.

CONTROL 3

A resin substrate with two layers of coating films formed thereon (R'1) was prepared in the same way as that described in Example 5 excluding the point that the dispersion sol (L) of the $SiO_2$—$Al_2O_3$ composite oxide particles (P'1) prepared in Control 1 was used in place of the dispersion sol (I) of the $SiO_2$—$Al_2O_3$ composite oxide particles (P3).

The total light beam transmittance, the haze, and the refraction coefficient of a light beam with the wavelength of 550 nm of the resin substrate (R'1) are shown in Table 2. The refractive index of a surface coating film was measured by forming a surface coating film directly on an acrylic plate without forming an intermediate coating film and measure a refractive index thereof with an elipsometer (made by ULVAC Corp.: EMS-1), and the result is shown in Table 2.

TABLE 1

| Particle | MO$_x$SiO$_2$ (mole) | P.D. (nm) | Pore Volume (ml/g) | Coating Film Thick. (nm) | Coating Film Max. P.D. (nm) | Ref. Index |
|---|---|---|---|---|---|---|
| P1 | 4.7 × 10$^{-3}$ | 27 | 0.17 | 3.5 | 2.0 | 1.36 |
| P2 | 4.3 × 10$^{-3}$ | 54 | 0.42 | 2.0 | 3.5 | 1.34 |
| P3 | 4.8 × 10$^{-3}$ | 25 | 0.14 | 2.5 | 1.5 | 1.39 |
| P4 | 3.6 × 10$^{-3}$ | 35 | 0.23 | 7.5 | 4.0 | 1.37 |
| P'1 | 20 × 10$^{-3}$ | 20 | 0.12 | 0 | 8.0 | 1.47 |
| P'2 | 8.0 × 10$^{-3}$ | 27 | 0 | 7.0 | 0 | 1.40 |

TABLE 2

| Substrate | Transmittance (%) | Haze (%) | Ref.Coef. (%) | Ref.Index | Adh. |
|---|---|---|---|---|---|
| F0 | 90.7 | 2.0 | 7.0 | — | |
| F1 | 95.8 | 0.6 | 0.9 | 1.39 | ○ |
| F2 | 95.0 | 0.9 | 0.7 | 1.36 | ○ |
| F3 | 94.7 | 1.1 | 0.8 | 1.38 | ○ |
| F4 | 96.0 | 0.4 | 1.0 | 1.38 | ◎ |
| F'1 | 91.2 | 1.8 | 5.0 | 1.45 | X |
| F'2 | 93.6 | 1.5 | 3.2 | 1.43 | Δ |
| R1 | 95.5 | 0.2 | 1.0 | 1.42 | ◎ |
| R2 | 96.7 | 0.2 | 0.6 | 1.40 | ◎ |
| R'1 | 93.0 | 0.2 | 3.7 | 1.48 | ◎ |
| G0 | 92.0 | 0.7 | 4.0 | — | |
| G1 | 96.7 | 0.4 | 0.5 | 1.27 | |
| G2 | 96.0 | 0.5 | 0.1 | 1.32 | |
| G3 | 95.5 | 0.5 | 0.6 | 1.38 | |
| G4 | 96.2 | 0.3 | 0.2 | 1.35 | |
| G'1 | 95.0 | 0.5 | 2.2 | 1.43 | |
| G'2 | 94.7 | 0.5 | 1.8 | 1.41 | |

EXAMPLE 7

Preparation of a Core Particle Dispersion Liquid 27.4 g methyltrimethoxysilane was mixed with 872.6 g sodium hydroxide aqueous solution with the concentration of 0.65 weight % and the resultant mixture solution was agitated for one hour under the room temperature, to give a colorless and transparent aqueous solution of partially hydrolysed with the concentration of 1.5 weight % as CH$_3$SiO$_{3/2}$.

Then 20 g of e sol dispersed silica particles as core particles with the average particle diameter of 5 nm and the SiO$_2$ concentration of 20 weight % was mixed in 380 g deionized water, and the mixture solution was heated to 80° C. The pH value of this reaction mother liquid was 10.5, and 900 g sodium silicate aqueous solution with the concentration of 1.5 weight % as SiO2, 900 g of the aqueous solution of the partially hydrolyzed compound and 1800 g sodium aluminate aqueous solution with the concentration of 0.5 weight % as Al$_2$O$_3$ were added to said mother above over 6 hours concurrently. During this step, the temperature of the reaction liquid was kept at 80° C. The pH value of the reaction liquid rose up to 12.7 immediately after addition of the reaction materials above, and little changed subsequently. After completion of addition above, the reaction liquid was cooled down to the room temperature, and was washed with an ultrafiltration membrane, to give a dispersion liquid (A1) of SiO$_2$—Al$_2$O$_3$ composite oxide containing a methyl group with the solid component concentration of 20 weight %.

Formation of a First Silica-based Coating Film Layer

Then 550 g deionized water was added to 250 g of the dispersion liquid (A1) and the mixture solution was heated to 98° C. 1000 g of a silicate liquid (with the SiO$_2$ concentration of 3.5 weight %) prepared by subjecting the sodium silicate aqueous solution to de-alkalization with a positive-ion exchange resin was added over 5 hours to the mixture solution without changing the temperature, to give a sol (B1) of fine particle precursor of the SiO$_2$—Al$_2$O$_3$ composite oxide containing a methyl group coated with silica.

Selective Removal of Elements

This sol (B1) was washed with a an ultrafiltration membrane to obtain a sol with the solid component concentration of 13 weight %, and then 1,125 g deionized water was added to 500 g of this sol, and then concentrated hydrochloric acid (35.5%) was dropped to the sol to adjust the pH value to 1.0, and was subjected to treatment for de-alkalization.

Then the sol was cleared with an ultrafiltration membrane by adding 10 liters of pH 3 hydrochloric acid aqueous solution and 5 liters of deionized water for removal of dissolved aluminum salt, and then the sol was condensed to give a dispersion sol (C1) of SiO$_2$—Al$_2$O$_3$ composite oxide fine particles containing a methyl group coated with silica with the solid component concentration of 13 weight %.

EXAMPLE 8

Formation of a Second Silica Coating Film Layer 1500 g of the dispersion sol (C1) having been subjected to washing in Example 1,500 g of deionized water, 1,700 g of ethanol, and 626 g of 28% ammonia water were mixed together, and the mixture was heated to 35° C. Then 104 g ethylsilicate (with the SiO$_2$ concentration of 28 weight %) was added to this mixture solution to give a dispersion sol (D2) of an open type of fine particles of SiO$_2$—Al$_2$O$_3$ composite oxide containing a methyl group coated with two silica layers in which a surface of the SiO$_2$—Al$_2$O$_3$ composite oxide fine particles coated with silica was further coated with a hydrolyte of ethylsilicate.

EXAMPLE 9

Heating Treatment

The dispersion sol (D2) prepared in Example 8 was condensed with an evaporator to the solid component concentration of 5 weight %, and then 15% ammonia water was added to the dispersion sol to adjust the pH value to 10, and further heated for two hours with an autoclave under the temperature of 180° C., to give a dispersion sol (E3) of sealed type of fine particles of the SiO$_2$—Al$_2$O$_3$ composite oxide containing a methyl group in which the silica coating film layer had no pores.

EXAMPLE 10

50.6 g vinyltrimethoxysilane was added to 849.4 g sodium hydroxide aqueous solution with the concentration of 1.3 weight %, and the mixture solution was agitated for one hour under the room temperature, to give a colorless and transparent aqueous solution of partially hydrolysed with the concentration of 3.0 weight % as CH$_2$SiO$_{3/2}$.

A dispersion sol (C4) of fine particles of the SiO$_2$—Al$_2$O$_3$ composite oxide coated with silica containing a vinyl group was prepared in the same way as that in Example 7 excluding the point that a colorless and transparent aqueous solution of partial hydrolyte prepared by hydrolyzing the vinyltrimethoxysilane described above was used in place of the colorless and transparent aqueous solution of partial hydrolyte prepared by hydrolyzing methyltrimethoxysilane in Example 7.

EXAMPLE 11

1500 g of the dispersion sol (C4) prepared in Example 10, 500 g deionized water, 1,750 g ethanol, and 626 g of 28% ammonia water were mixed together, and the mixture solution was added to 35° C. Then, 104 g ethylsilicate (with the $SiO_2$ concentration of 28 weight %) was added to the mixture solution, to give a dispersion sol (D5) of an open type of fine particles of the $SiO_2$—$Al_2O_3$ composite oxide containing a vinyl group coated with two silica layers in which a surface of the $SiO_2$—$Al_2O_3$ composite oxide fine particles coated with silica was further coated with the hydrolyte of ethylsilicate.

EXAMPLE 12

The dispersion sol (D5) prepared in Example 11 was condensed with an evaporator to the solid component concentration of 5 weight %, then 15% ammonia water was added to adjust the pH value to 10, and the mixture was heated for two hours with an autoclave under the temperature of 180° C., to give a dispersion sol (E6) of sealed type of fine particles of $SiO_2$—$Al_2O_3$ composite oxide containing a vinyl group in which the silica coating film layer had no pores.

EXAMPLE 13

A dispersion sol (C7) of fine particles of $SiO_2$—$ZrO_2$ composite oxide coated with silica containing a methyl group was prepared in the same way as that in Example 7 excluding the point that 1800 g of zirconium carbonate aqueous solution with the concentration of 0.5 weight % as $ZrO_2$ was used in place of the sodium aluminate aqueous solution used in Example 7.

EXAMPLE 14

1500 g of the dispersion sol (C7) having been subjected to washing in Example 13, 500 g deionized water, 1,750 g ethanol, and 626 g of 28% ammonia water were mixed together, and the mixture solution was heated to 35° C. Then 104 g ethylsilicate (with the $SiO_2$ concentration of 2.8 weight %) was added to the mixture solution, to give a dispersion sol (D8) of an open type of fine particles of the $SiO_2$—$ZrO_2$ composite oxide containing a methyl group coated with two silica layers in which the surface of the fine particles of the $SiO_2$—$ZrO_2$ coated with silica was further coated with the hydrolyte of ethylsilicate.

EXAMPLE 15

The dispersion sol (D8) prepared in Example 14 was condensed with an evaporator to the solid component concentration of 5 weight %, and then 15% ammonia water was added to adjust the pH value to 10, and, subjected to heating treatment with an autoclave under the temperature of 180° C. for two hours to give a dispersion sol (E9) of the sealed type of fine particles of $SiO_2$—$ZrO_2$ composite oxide containing a methyl group in which the silica coating film layer had no pores.

CONTROL 4

A mixture of 100 g silica sol with the $SiO_2$ concentration of 20 weight % and 1900 g deionized water was heated to 80° C. This reaction mother liquid was pH 10.5, and 9000 g of sodium silicate aqueous solution with the concentration of 1.5 weight % as $SiO_2$ and 9000 g of sodium aluminate aqueous solution with the concentration of 0.5 weight % as $Al_2O_3$ were concurrently added to this mother liquid. During this step, the temperature of this reaction liquid was kept at 80° C. Immediately after addition of the compounds, the pH value of the reaction liquid rose to 12.5, and then little changed subsequently. After the compounds were added, the reaction liquid was cooled down to the room temperature, washed with e an ultrafiltration membrane, and condensed to give a sol (S) of fine particle precursor of the $SiO_2$—$Al_2O_3$ composite oxide with the solid component concentration of 20 weight %.

1,700 g of deionized water was added to 500 g of this precursor sol (S), and the mixture was heated to 98° C. 2,000 g of a silicate solution (with the $SiO_2$ concentration of 3.5 weight %) prepared by subjecting the sodium silicate aqueous solution to de-alkalization with a positive-ion exchange resin was added to the mixture over 5 hours to give a sol (T) of fine particle precursor of the $SiO_2$—$Al_2O_3$ composite oxide coated with silica.

This sol (T) was washed with a an ultrafiltration membrane to adjust the solid component concentration of 13 weight %, and 1,125 g deionized water was added to 500 g of this sol, and further concentrated hydrochloric acid (35.5%) was dripped to adjust the pH value to 1.0, and treatment for removing aluminum was performed.

Then dissolved aluminum salt was removed with an ultrafiltration membrane by adding 10 liters of hydrochloric acid aqueous solution with pH 3 and 5 liters of deionized water, to give a dispersion sol (U) of fine particles of $SiO_2$—$Al_2O_3$ composite oxide coated with silica.

CONTROL 5

A mixture of 20 g of silica sol with the average particle diameter of 5 nm and the $SiO_2$ concentration of 20 weight % and 380 g deionized water was heated to 80° C. The pH value of this reaction mother liquid was 10.5, and 1.800 g of sodium silicate aqueous solution with the concentration of 1.5 weight % as $SiO_2$ and 1800 g of sodium aluminate aqueous solution with the concentration of 0.5 weight % as $Al_2O_3$ were concurrently added to this mother liquid. The addition rate was 5 ml/minute, and the temperature of the reaction liquid was kept at 80° C. during this step. The pH value of this reaction liquid rose to 12.5 immediately after the addition, and little changed subsequently. After the addition was complete, the reaction liquid was cooled down to the room temperature to give a dispersion liquid (O) of fine particles of $SiO_2$—$Al_2O_3$ composite oxide.

1,700 g deionized water was added to 500 g of this dispersion liquid (0), and the mixture solution was heated to 98° C. 3,000 g of a silicate solution (with the $SiO_2$ concentration of 3.5 weight %) prepared by subjecting the sodium silicate aqueous solution to de-alkalization with an ion exchange resin was added to this solution preserving the temperature. This sol was washed with an ultrafiltration membrane to obtain a sol with the solid component concentration of 13 weight %, and then 1,125 g deionized water was added to 500 g of this sol, and further concentrated hydrochloric acid (35.5%) was dripped to adjust the pH value to 1.0 for removing aluminum. Then dissolved aluminum salt was removed with an ultrafiltration membrane by adding 10 liters of hydrochloric acid aqueous solution with pH 3 and 5 liters of deionized water concurrently, to give a dispersion sol (P) of fine particles of the $SiO_2$—$Al_2O_3$ composite oxide with a portion of aluminum having been removed therefrom.

1,500 g of this dispersion liquid (P), 500 g deionized water, 1,750 g ethanol, and 626 g of ammonia water with the concentration of 28% were mixed together, and the mixture was heated to 35° C. Then 104 g of ethylsilicate (with the $SiO_2$ concentration of 28 weight %) was added to the mixture to coat surfaces of the composite oxide fine particles with a hydrolyzed condensate of ethylsilicate. Then the condensate was further condensed to the solid component concentration of 5 weight %, and then 15% ammonia water was added to adjust the pH value to 10, and the condensate was subjected to heat treatment with an autoclave for two hours under the temperature of 180° C., to give a dispersion liquid (Q) of fine particles of $SiO_2$—$Al_2O_3$ composite oxide coated with silica.

CONTROL 6

The dispersion liquid (A1) of $SiO_2$—$Al_2O_3$ composite oxide containing a methyl group prepared in Example 7 was washed with a an ultrafiltration membrane to give a dispersion liquid (R) of fine particles of $SiO_2$—$Al_2O_3$ composite oxide containing a methyl group with the solid component concentration of 13 weight %.

Characteristics of the core particle precursor and the coating film layers prepared in Examples 7 to 15 and Controls 4 to 6 described above are shown in Table 3, and characteristics and refractive indexes of the composite oxide fine particles and dispersion stability of the sols are shown in Table 4.

The dispersion stability was assessed by visually observing the state of a dispersion liquid prepared by mixing 100 weight portions of the dispersion sols (C1, D2, E3, etc) and 75 weight portions of acrylic resin emulsion (produced by ZENECA (K.K), A-614 with the acrylic resin concentration of 32 weight % in an aqueous medium) after left for one day according to the following criteria. Further the refractive index of fine particle was measured by the method described in Example 1.

| | |
|---|---|
| ○ | Those in the well dispersed state like that immediately after mixing |
| Δ | Those in which a resin layer and a particle layer are separated |
| X | Those in which viscosity of the dispersion solution increased or gelation occurred. |

TABLE 3

| | Core particle precursor | | Coating layer |
|---|---|---|---|
| | Ave.P.D. (nm) | $Mo_x/SiO_2$ (mole) | Thickness (nm) |
| Example 7 | 19.6 | 0.17 | 1.0 |
| Example 8 | 19.6 | 0.17 | 7.3 |
| Example 9 | 19.6 | 0.17 | 7.0 |
| Example 10 | 27.2 | 0.12 | 1.4 |
| Example 11 | 27.2 | 0.12 | 10.1 |
| Example 12 | 27.2 | 0.12 | 9.7 |
| Example 13 | 23.1 | 0.17 | 1.2 |
| Example 14 | 23.1 | 0.17 | 8.6 |
| Example 15 | 23.1 | 0.17 | 8.3 |
| Control 4 | 20.2 | 0.17 | 3.5 |
| Control 5 | 19.9 | 0.17 | 5.1 |
| Control 6 | 19.6 | 0.17 | — |

TABLE 4

FINE PATICLES OF COMPOSITE OXIDE

| | $MO_x/SiO_2$ (mole) | $S_R/S_T$ (mole) | P.V. (cc/g) | Ave. P.D. (nm) | Stability | Ref. Index |
|---|---|---|---|---|---|---|
| Example 7 | $4.26 \times 10^{-3}$ | 0.26 | 0.30 | 21.6 | ○ | 1.31 |
| Example 8 | $3.60 \times 10^{-3}$ | 0.23 | 0.22 | 34.2 | ○ | 1.34 |
| Example 9 | $3.69 \times 10^{-3}$ | 0.23 | 0.00 | 33.6 | Δ | 1.36 |
| Example 10 | $3.12 \times 10^{-3}$ | 0.36 | 0.50 | 30.0 | ○ | 1.26 |
| Example 11 | $2.68 \times 10^{-3}$ | 0.31 | 0.41 | 47.4 | ○ | 1.28 |
| Example 12 | $2.66 \times 10^{-3}$ | 0.30 | 0.00 | 46.6 | Δ | 1.33 |
| Example 13 | $6.66 \times 10^{-3}$ | 0.24 | 0.22 | 25.5 | ○ | 1.34 |
| Example 14 | $5.77 \times 10^{-3}$ | 0.21 | 0.19 | 40.3 | ○ | 1.35 |
| Example 15 | $5.69 \times 10^{-3}$ | 0.21 | 0.00 | 39.7 | Δ | 1.38 |
| Control 4 | $4.72 \times 10^{-3}$ | 0.00 | 0.17 | 27.2 | X | 1.36 |
| Control 5 | $7.86 \times 10^{-3}$ | 0.00 | 0.00 | 30.1 | Δ | 1.42 |
| Control 6 | $170 \times 10^{-3}$ | 0.44 | 0.08 | 19.6 | ○ | 1.46 |

What is claimed is:

1. Porous fine particles of composite oxide comprising: silica, an inorganic oxide other than silica, and a porous silica-based inorganic oxide layer coated on said silica and said inorganic oxide and having a thickness from 0.5 to 20 nm and a maximum pore diameter in a range from 0.5 to 5 nm.

2. The fine particles of claim 1, wherein a molar ratio of $MO_x/SiO_2$ is in a range from 0.0001 to 0.2, when silica is expressed by $SiO_2$ and the inorganic oxide other than silica is expressed by $MO_x$.

3. The fine particle of claim 1, wherein pore volume is in a range from 0.1 to 1.5 cc/g.

4. Fine particles further comprising a second silica coating film layer coating a surface of the fine particles of claim 3.

5. The fine particles of claim 1, wherein said fine particles have an average diameter of 5–300 nm.

6. A sol in which the fine particles of claim 1 are dispersed in a dispersion medium.

7. A substrate with a coating film formed on a surface thereof, said coating film containing the fine particles according to claim 1 and a matrix for forming a coating film.

8. The film-coated substrate according to claim 7, wherein a refractive index of the substrate is 1.60 or more.

9. A film-coated substrate comprising an intermediate coating film with a refractive index of 1.60 or more formed on a surface of a substrate having a refractive index of 1.60 or less, said coating film having the fine particles according to claim 1 and a matrix for forming a coating film thereon.

10. The film-coated substrate of claim 9, wherein sail intermediate coating film contains fine particles of metal oxide with an average particle diameter in a range from 5 to 100 nm by 30 to 95 weight %.

11. The Porous fine particles of composite oxide comprising: silica, an inorganic oxide other than silica, and a porous silica-based inorganic oxide layer coated on said silica and said inorganic oxide and having a thickness from 0.5 to 20 nm wherein said fine particles include an organic group directly bonded to silicon, and a ratio of a molar amount of silicon having the organic group directly bonded thereto vs a molar amount of a total silicon, is in range from 0.001 to 0.9.

12. A sol in which the fine particles of claim 11 are dispersed in a dispersion medium.

13. A substrate with a coating film formed on a surface thereof, wherein said coating film containing the fine particles according to claim 11 and a matrix for forming a coating film.

14. The film-coated substrate according to claim 13, wherein a refractive index of the substrate is 1.60 or more.

15. A film-coated substrate comprising an intermediate coating film with a refractive index of 1.60 or more formed on a surface of a substrate having a refractive index of 1.60 or less, said coating a film having the fine particles according to claim 11 and a matrix for forming a coating film thereon.

16. The film-coated substrate of claim 15, wherein said intermediate coating film contains fine particles of metal oxide with an average particle diameter in a range from 5 to 100 nm by 30 to 95 weight %.

17. A method of producing fine particle dispersion sol comprising the steps of:
   (a) preparing a dispersion liquid of core particle precursor by concurrently adding an aqueous solution of a silicate and/or an acidic silicate solution, a hydrolyte of an organic silicon compound expressed by formula (1), and a solution of an alkali-soluble inorganic compound to an alkaline aqueous solution with a pH value of 10 or more, or to an alkaline aqueous solution with a pH value of 10 or more in which species particles are dispersed, if necessary;
   (b) forming a first silica-based coating film layer on the core particle precursor by adding a silica source or an aqueous solution of the silica source and any inorganic salt other than silica to said dispersion liquid of the core particle precursor; and
   (c) selectively removing at least a portion of elements other than silicon and oxygen from among those constituting said core particle precursor by adding an acid to said dispersion liquid;

$$R_n SiX_{(4-n)} \quad (1)$$

wherein R indicates a non-substituted or substituted hydrocarbon comprising 1 to 10 carbon elements; X indicates an alkoxy group containing 1 to 4 carbon elements, a silanol group, halogen, or hydrogen, and n indicates a number from 1 to 3.

18. A method of producing fine particles dispersion sol further comprising the step of forming a second silica coating film layer on said fine particles by adding an alkaline aqueous solution, an organic silicon compound expressed by formula (2) and/or a partial hydrolyte thereof to the fine particle dispersion sol prepared in the step (c) in claim 17, $$R_n SiX_{(4-n)} \quad (2)$$

wherein R indicates a not-substituted or substituted hydrocarbon comprising 1 to 10 carbon elements; X indicates an alkoxy group containing 1 to 4 carbon elements, a silanol group, halogen, or hydrogen, and n indicates a number from 0 to 3.

19. A method of producing fine particle dispersion sol further comprising the step of eliminating pores in the second silica coating film layer by heating the fine particle dispersion sol prepared in claim 18 under a temperature from 50° C. to 350° C.

* * * * *